Oct. 13, 1942.   E. K. CLARK ET AL   2,298,928
THERMOSTAT
Filed May 6, 1938   2 Sheets-Sheet 1

WITNESSES:
C. F. Oberheim
N. G. Hepler

INVENTORS
Earl K. Clark &
Paul R. Lee.
BY
W. R. Coley
ATTORNEY

Oct. 13, 1942.    E. K. CLARK ET AL    2,298,928
THERMOSTAT
Filed May 6, 1938    2 Sheets-Sheet 2

WITNESSES:
C.F. Oberheim
H.G. Hepler

INVENTORS
Earl K. Clark &
Paul R. Lee.
BY
W.R. Coley
ATTORNEY

Patented Oct. 13, 1942

2,298,928

UNITED STATES PATENT OFFICE 2,298,928

THERMOSTAT

Earl K. Clark and Paul R. Lee, Mansfield, Ohio, assignors to Westinghouse Electric & Manufacturing Company, East Pittsburgh, Pa., a corporation of Pennsylvania Application May 6, 1938, Serial No. 206,329

7 Claims. (Cl. 200—139)

Our invention relates to thermostats and more particularly to a high-wattage bimetallic creep-type thermostat.

An object of our invention is to provide an efficient, rugged, low cost, high-wattage bimetallic creep-type thermostat capable of handling operating loads in excess of 660 watts at 110 volts.

A further object of our invention is to provide a high-wattage creep-type thermostat capable of being readily disposed in juxtaposition with a heated cooking device so as to maintain good thermal contact therewith and quickly respond to changes in temperature of the device.

A further object of our invention is to provide a high-wattage creep-type thermostat devoid of contact fluttering by reason of the provision of a positive contact pressure resulting in a positive "on" and "off" operation.

A further object of our invention is to provide a high-wattage creep-type thermostat which will be free of fluttering by reason of the provision of a bimetallic member which will not carry any of the load current thereof, which is removed from the contacts so as not to receive any heat therefrom, and which is operatively associated with the contacts in such a manner that it must do work to disengage such contacts.

A still further object of our invention is to provide a high-wattage creep-type thermostat for roasters capable of metallic contact with the roaster base, thus insuring a good thermal contact therewith.

A further object of our invention is to provide a high-wattage creep-type thermostat capable, independent of the contacts thereof, of adjustably operating the thermostat throughout its range of operation and for manually disengaging the contacts.

Other objects of our invention will either be pointed out specifically in the course of the following description of a device embodying our invention, or will be apparent from such description.

Figure 1:
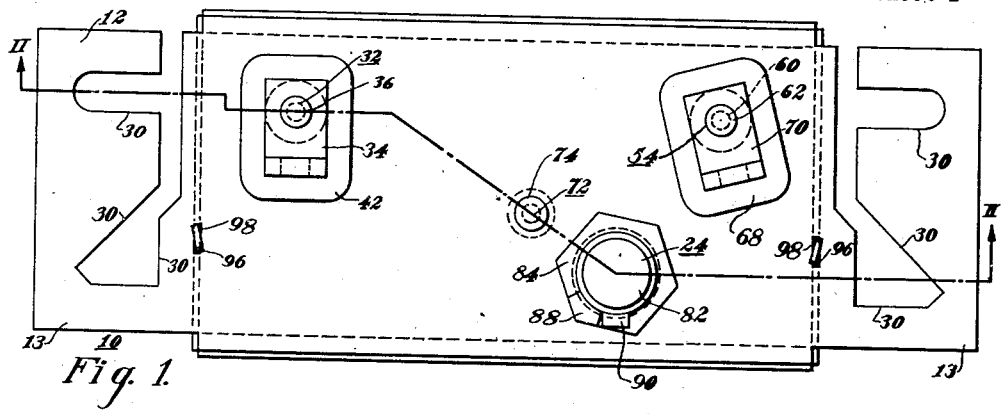
Figure 1 is a top plan view of the device embodying our invention.

Referring to the accompanying drawings, we show a creep-type thermostat or circuit interrupter 10, a supporting structure or base 12, cooperating stationary and movable contacts 14 and 16, respectively, resilient member 18 for carrying the movable contact 16, flexible shunt 20 for member 18, bimetallic member 22 for acting upon resilient member 18, and manually operable adjusting means 24 for changing the effective position of bimetallic member 22.

Generally, as hereinafter described in greater detail and indicated in the accompanying figures, the operation of the thermostat 10 is substantially as follows. The bimetallic member 22 flexes or changes its shape in response to the changes in temperature thereof, and while so changing its shape, rocks about an intermediate fulcrum or pivot-rivet 72. Due to such rocking, the free end of bimetallic member 22 will contact the resilient member of flat spring 18, which carries the movable contact 16 on the free end thereof, forcing such resilient member to be carried with it as it overcomes the biasing action thereof. This action in turn causes the contacts 14—16 to be disengaged. The adjusting means 24 is operatively associated with the end of the bimetallic member 22 opposite its free end so as to readily adjust the bimetallic member to a plurality of operating positions. When so adjusted, the free end of the bimetallic member 22 will, due to such member rocking about pivot-rivet 72 and the retention of the other end by the cooperation of the adjusting means 24, contact the resilient member 18 at different temperature values of the bimetallic member 22, depending upon the relative positions of the cooperating end of the bimetallic member 22 and the adjusting means 24. The flexible shunt 20 is positioned across the resilient member 18 to prevent undue passage of current through such resilient member, to insure proper operation thereof.

More specifically, the supporting structure or base 12 comprises, in this instance, substantially a flat piece of metal having end lugs 13. However, it is to be understood that the base or supporting structure may be of any other desired material or suitable shape. Such base or supporting structure should have as high a coefficient of heat conductivity as possible to permit the ready passage of heat therethrough, thus insuring a uniform operation of the thermostat in response to the changing temperature conditions of a device such as a roaster, which is controlled thereby.

Multiple slots or angularly related apertures 30 are positioned in each lug 13. These apertures permit the thermostat 12 to be rigidly attached to a structure such as a roaster. In addition, the peculiar shape of the aperture permits the thermostat as a whole to be moved with respect to the supporting structure even though the base 12 be rigidly attached thereto. This feature permits the thermostat to be moved so as to eliminate any binding action which might occur between the adjusting means 24 and the supporting structure or roaster, as such means normally extends through the outer cover of such structure in accordance with a familiar practice.

The stationary contact 14 includes a stationary silver contact tip 15 which is welded or rigidly attached to a suitable stationary contact rivet 32. The rivet 32 has an upstanding shaft portion 33 which extends through aperture 31 in the base 12 and through a suitable stationary terminal 34. The upper end of the shaft 33 of the stationary contact rivet 32 is riveted or spun over against the base of terminal 34 to provide proper electrical conductivity and at the same time effect a rigid assembly of the contact rivet 32 and terminal 34 with the base 12. The contact rivet 32 is insulated from base 12 and centered within the aperture 31 by means of suitable insulating washers 38 and 40, respectively. The terminal 34 is insulated from the top portion of the base 12 by means of a suitable insulating washer 42. Current may then readily pass from a power supply (not shown) through terminal 34 to contact 14.

The movable contact 16 comprises a silver contact rivet 45 having a main or contact portion 46 and a shank portion 48. The shank portion 48 of the contact 16 is positioned through the free ends of the resilient member 18 and shunt 20, and riveted thereover to form a solid mechanical and electrical connection therewith, as shown at 50 in Figs. 2, 4 and 5. If desired, an additional metallic washer 52 may be positioned between the shunt 20 and the spun-over head of the shank 48 to enable the rivet to be solidly connected to the spring 18 and shunt 20 without injuring such members.

The resilient member 18 extends longitudinally of base 12 and comprises, in this instance, a strip-type elastic member rigidly attached at one end to the base 12 as hereinafter described and supports the movable contact 16 at its other or free end substantially as hereinabove described. The resilient member 18 is attached to the base in such a manner that it will upwardly bias the movable contact 16 against the stationary contact 14, so as to insure a positive contact pressure between the cooperating contacts at all times.

The shunt 20 is preferably a flexible aluminum member which is mounted alongside the resilient member 18 in such a manner, as hereinafter described, that it will conduct the major portion of the current passing through the movable contact 16, thereby reducing the amount of current passing through the resilient member 18 to an inappreciable amount. This construction prevents the resilient member 18 from becoming unduly heated by the load current of the thermostat, thereby insuring the retention of the resiliency of the member 18 throughout the life of the thermostat and further insuring the maintenance of a positive contact pressure between movable contact 16 and stationary contact 14.

Figure 2:
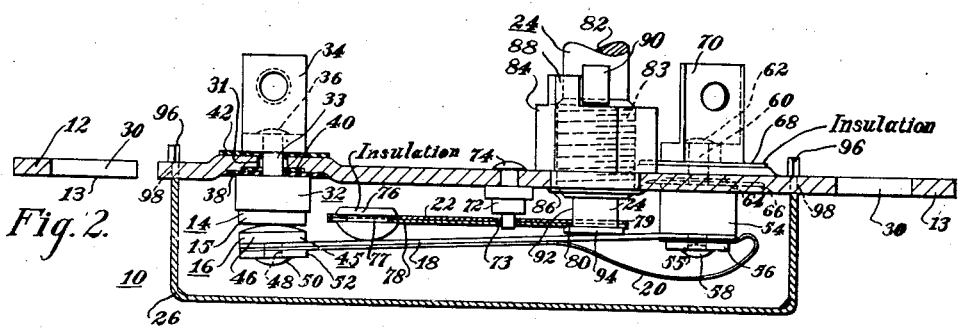
Fig. 2 is a sectional view taken along the line II—II of Fig. 1 with the device in an operative position.

The resilient member 18 and shunt 20 are rigidly attached, in this instance, to the supporting structure or base 12 by means of a rivet 54. The rivet 54 has a downwardly extending shank 55 of reduced diameter which extends through the resilient member 18 and the shunt 20, and, if desired, a washer 56, the free end thereof being riveted over against the washer 56 as shown at 58 in Figs. 2, 4 and 5 to rigidly attach the resilient member 18 and shunt 20 against the main body portion of rivet 54. It is preferred that the shunt 20 be looped down below the resilient member 18, its end being bent backward and held in position by rivet 54. In this way shunt 20 will not contact the resilient member throughout its entire length, substantially as shown in Fig. 2. This construction is followed to enable the shunt 20 to freely flex with the resilient member 18 without restraining the action thereof, as well as to reduce the tendency of any heat developed therein, due to the passage of current therethrough, from being transmitted to the resilient member 18.

The rivet 54 may be rigidly attached to the supporting structure or base 12 substantially in a manner as hereinabove described with respect to the contact rivet 32. The rivet has an upwardly extending shank portion 60 of reduced diameter which extends through suitable insulating washers 64 and 66, an aperture in the base 12, another insulating washer 68 and a terminal 70, the upper end of the shank 60 being spun over or riveted tightly against the terminal 70 as shown at 62 in Figs. 2, 4 and 5, to rigidly attach the rivet 54 and terminal 70 to the supporting base 12.

Figure 3:
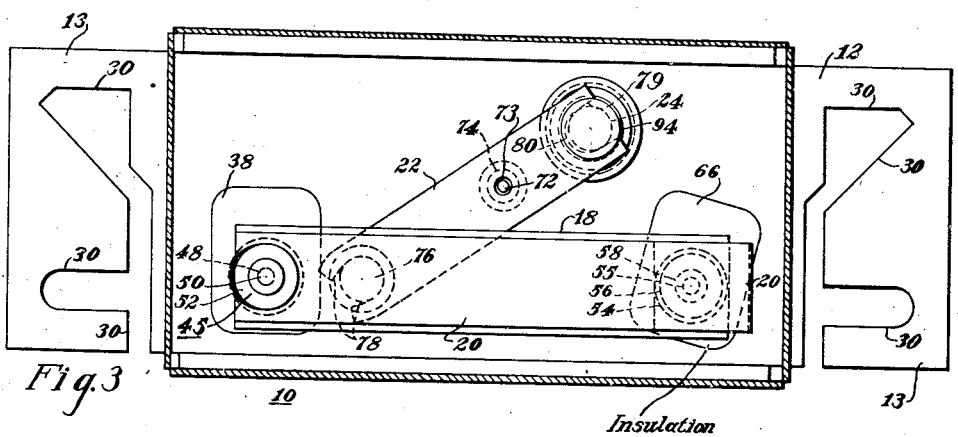
Fig. 3 is a bottom plan view of the device shown in Figs. 1 and 2.
Figure 4:
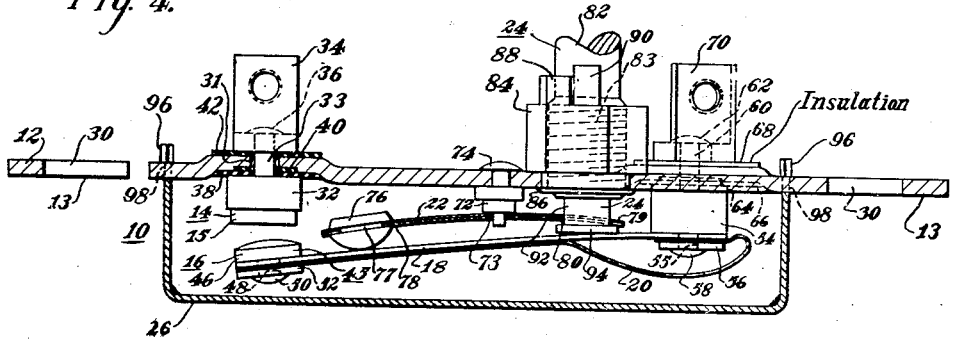
Fig. 4 is a view similar to Fig. 2 with the device in a thermally inoperative position.

The thermal responsive or bimetallic member 22 is, in this instance, a strip-type member having the ends thereof bifurcated or notched for a purpose hereinafter described, and extends at an acute angle to spring 18, as shown in Fig. 3. However, it is to be understood that such member may be of a disc shape or of any other suitable configuration. The strip-type bimetallic member 22 is pivotally mounted or attached, intermediate the ends thereof, to the base 12 by means of the pivot-rivet 72, as hereinafter described, so that the member will tend to arch itself upwardly with respect to, or away from, the resilient member 18 upon an increase in temperature of such bimetallic member, substantially as shown in Fig. 4. The pivot-rivet 72 is rigidly attached to the base 12 by being riveted thereto, as shown at 74 in Fig. 2. Such rivet 72 will then readily conduct heat from the base 12 to the bimetallic member 22, thus reducing the temperature lag between the base 12 and the bimetallic member 22 to a minimum value.

An insulator button 76, preferably of a ceramic material such as porcelain, is rigidly attached to the bifurcated or free end 78 of the bimetallic member 22. The insulator pin 76 has an annular notch 77 positioned therein to cooperate with the bifurcated end 78. The bifurcations of the bifurcated end 78 of the bimetallic member 22 are compressed or bent about the porcelain button 76 within the annular notch 77, to rigidly attach such porcelain button to the free end of the bimetallic member 22. The other end of the bimetallic member 22 is notched or bifurcated to loosely fit adjusting means 24 and permit cooperation therewith in a manner hereinafter described.

The bimetallic member 22 is thus loosely or pivotally retained in position due to its cooperation with the resilient member 18 through insulator button 76 at one end, the adjusting means 24 at the other end and the pivot-rivet 72 intermediate the ends thereof. The insulator button 76 in contacting the resilient member 18 and the cooperation of the other end of bimetallic member 22 with adjusting means 24 prevents the bimetallic member 22 from falling off or becoming disengaged from pivot-rivet 72. In addition, the cooperation of pivot-rivet 72 within the aperture 73 in bimetallic member 22, and the cooperation of notched end 79 with the adjustable means 24 prevents angular rotation of the bimetallic member 22 in the plane thereof. It, therefore, follows that the bimetallic member 22, while being loosely mounted upon the base 12 independent of the contacts 14 and 16 due to the cooperation of adjustable means 24, the resilient member 18 and the pivot-rivet 72 is maintained in its operative relationship with respect to such adjusting means 24 and resilient member 18 at all times. This in turn permits the bimetallic member 22 to freely change its shape in response to the temperature changes thereof, and to effect disengagement of the cooperating contacts 14 and 16 in a manner hereinafter described.

The manually operable adjusting means 24 comprises, in this instance, an adjusting shaft 82 rotatably mounted within the base or supporting structure 12. The shaft 82 has a threaded portion 83 which cooperates with an internally-threaded upwardly extending insert member or sleeve 84. The insert member 84 is positioned on and rigidly attached to base 12 by having a portion thereof extending through the base and riveted or spun over against the underside of base 12 to make a rigid connection therewith, as shown at 86 in Fig. 2. An upwardly extending stop 88 is positioned upon or is integral with the insert member 84 to limit the rotation of the shaft 82, as hereinafter described. However, it is to be understood that any other suitable stop may be used to limit the rotation of shaft 82.

A protruding lug or stop 90 is rigidly attached to the shaft 82 to cooperate with stop 88 so as to limit rotation of the shaft. This lug 90 will contact stop 88 on insert member 84 as the shaft 82 is rotated through a predetermined angle within the insert member to limit the rotation of such shaft therein. It is preferred that the relative sizes and cooperative action of lug 90 and stop 88 will permit the angular rotation of the shaft 82 to be substantially of the order of 250°, although any other suitable arrangement may be selected. This feature requires the cooperative threaded portion 83 of shaft 82 and the internally threaded insert 84 to be of such a pitch that as the shaft 82 is rotated within the insert 84, such shaft will be moved vertically along its longitudinal axis a distance which will properly adjust the thermostat throughout its range of operation in a manner hereinafter described.

An annular notch 92 is positioned within the lower portion of the shaft 82 and cooperates with the notched end 79 of the bimetallic member 22. Due to the notch 92 being positioned within the shaft 82, a flange 94 will be located at the bottom of the shaft 82 and will limit downward movement of the bimetallic member 22 with respect to the shaft 82. It, therefore, follows that as shaft 82 of adjusting means 24 is moved upwardly, the cooperative action of flange 94 with the bimetallic member 22 will cause the notched end 79 thereof to be correspondingly moved upwardly.

Accordingly, inasmuch as the bimetallic member 22 is fulcrumed about the pivot-rivet 72, the free end thereof and associated insulator button 76 will be moved relatively closer or farther away from the resilient member 18, depending upon whether the shaft 82 be moved upwardly or downwardly, respectively, as hereinafter described.

If desired, a sealing cup or protective cover 26 may be positioned upon the base or supporting structure 12. The sealing cup 26 may be attached below the base 12 by having extending ears 96 project upwardly through cooperating apertures 98 in base 12 as the cup is positioned over the working parts of the thermostat 10. The ears 96 on sealing cup 26 may then be twisted about their longitudinal axis so as to retain the cup upon the base 12 in a manner well known in the fabricating art.

The operation of our invention may be set forth as follows: As the thermostat is heated by reason of its juxtaposition with the roaster, for example, the temperature of the bimetallic member 22 increases, causing it to curve or flex convexly upwardly in a familiar manner. In other words, the central portion of the bimetallic member 22 will be bent upwardly, the ends thereof extending downwardly, or, in this instance, toward the resilient member 18 and away from the base 12. The pivot-rivet 72 will limit the upward travel of the central portion of the bimetallic member 22, and the vertically adjusting means 24 will adjustably limit the position of the downward travel of the cooperating notched end 79 of the bimetallic member 22. In addition, the notched end 79 of the bimetallic member 22 will, due to such member being flexed convexly upwardly and due to its cooperation with pivot-rivet 72, be forced downwardly against the flange 94 so that it will not be possible for the end 79 to creep up along the notch 92, even though shaft 82 is adjusted downwardly. The free end 78 of the bimetallic member 22 and insulator button 76 will then be free to flex downwardly toward the resilient member 18. The amount of this downward travel, with respect to the pivot-rivet 72 and the adjusting means 24, depends upon the relative vertical position of the adjusting means 24 and the cooperating end 79 of the bimetallic member 22.

Inasmuch as the bimetallic member 22 changes its curvature or shape in response to the changes in temperature thereof, it, therefore, follows that the temperature or particular curvature at which the bimetallic member 22 will begin to overcome the upwardly biasing action of resilient member 18 will depend upon the relative positions of the notched end 79 of the bimetallic member 22 and adjusting means 24 with respect to the pivot-rivet 72. Accordingly, should the adjusting means 24 be positioned in a lower position or farther away from the base 12 in a manner as hereinafter described, the bimetallic member 22 will be forced to arch or flex in a higher arch, or change its curvature a greater amount than if it were positioned relatively closer to the base 12 before the insulator button 76 will contact the resilient member 18 and bias it downwardly.

With the adjusting means 24 located in such a lower position, the thermostat will operate to disengage contacts 14 and 16 at a relatively higher temperature value, as hereinafter described.

Figure 5:
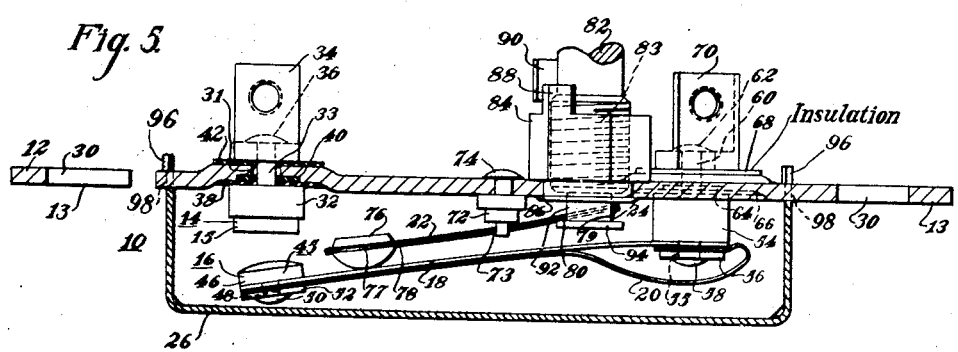
Fig. 5 is a view similar to Fig. 2 with the device in a manually inoperative position.

In addition, if desired, the pitch of the cooperating threads between shaft 82 and the insert 84 may be such that the adjusting means 24 may be manually raised to such an extent that the bimetallic member 22 will contact the resilient member 18 and overcome its upward biasing action to cause the contacts 14—16 to be manually disengaged as shown in Fig. 5. The bimetallic member 22 is then free to change its shape with changes in temperature. However, due to the adjusting means 24 being in a raised position, the contacts 14—16 will not be permitted to become reengaged as the bimetallic member 22 continuously, regardless of its temperature, restrains resilient member 18 in its open position. In other words, an operator may, through the cooperative action of the adjusting means 24, operate the thermostat 10 as a manually operable circuit interrupter or as an adjustable thermostat operating in response to the temperature thereof.

It will be noted that the bimetallic thermal responsive member 22 is loosely mounted intermediate the ends thereof by pivot-rivet 72 and is supported by or rests upon the resilient member 18 at one end, through insulator button 76. The degree of supporting pressure between the thermal responsive member 22 and resilient member 18 is adjusted by the manually adjusting means 24, which, in addition mounts or supports the other end of the thermal responsive member 22.

When utilizing in practice the high-wattage creep-type thermostat or circuit interrupter 10 embodying our invention, in conjunction with an electrically heated cooking device (not shown), the base 12 thereof is rigidly attached to the electrically heated device by means of the apertures 30, as previously noted. The terminals 34 and 70 of the thermostat are then operatively associated with a power supply (not shown). Then, assuming the electrically heated device, which is being controlled by means of the thermostat 10, is at a low temperature value, the bimetallic member 22 will be substantially in a straight line as shown in Fig. 2, and the resilient member 18 will, therefore, bias the movable contact 16 into engagement with the stationary contact 14. With the cooperating contacts 14 and 16 engaged, the power supply will, therefore, be connected to the electrically heated device, whereupon such device will increase in temperature.

As the temperature of the controlled device increases, heat therefrom will be conducted to the bimetallic member 22 through pivot-rivet 72 and shaft 82 and, in addition, a portion thereof will be conducted through the base 12 and radiated to the bimetallic member 22. When the temperature of the bimetallic member 22 is increased in such a manner, it will change its curvature from a substantially straight condition (see Fig. 2) to a relatively convex upwardly shape, substantially as shown in Fig. 4. As the bimetallic member 22 flexes towards its relatively convex shape, the insulator button 76 on the free or movable end 78 of the bimetallic member 22 will first contact the resilient member 18, and then as the bimetallic member 22 continues to flex in such a convex manner, the insulator button 76 will, inasmuch as the central portion of the bimetallic member 22 is retained in a fixed position by pivot-rivet 72 and the other end of such bimetallic member is adjustably limited in its position by means of the shaft 82 of the adjusting means 24, as hereinabove described, force the resilient member downwardly, disengaging the cooperative contacts 14 and 16.

When the contacts 14 and 16 become so disengaged, the power supply is disconnected from the heated device, permitting such device to gradually cool. The bimetallic member 22 will thereupon return towards its original straight position of Fig. 2, permitting the biasing action of resilient member 18 to cause the movable contact 16 to become reengaged with the stationary contact 14, thereby reconnecting the heating device to the power supply, permitting repetition of the above-described operating cycle. The thermostat 10 thus maintains a substantially constant average temperature value in the controlled heating device, as selected by adjusting means 24.

When its is desired to operate the thermostat 10 as a switch, the shaft 82 is rotated by the operator so that the shaft will be moved upwardly. The lower end of the shaft 82, through its cooperation with the bimetallic member 22, as hereinabove described, will then cause the bimetallic member to be rotated about the pivot-rivet 72 as a fulcrum, and the insulator button 76 will contact the resilient member 18. A continued rotation of the shaft 82 will cause the bimetallic member 22, regardless of its curvature, to force the resilient member 18 downwardly, disengaging contacts 14—16. The contacts will remain opened until the shaft 82 is returned to a normal operating position. It will be understood that the bimetallic member 22, during any such manual control period will continue to change its shape with changes in temperature. However, the bimetallic 22 will be disposed in such a manner that it will not permit the contacts to be reengaged at or near operating room temperature, and the contacts will actually remain disengaged until adjusting means 24 has been returned to a suitable position.

It is, therefore, obvious that the adjusting means 24 through the vertical movement of the shaft 82 with respect to the base 12, changes one of the stationary limiting or end positions of the bimetallic member 22. This, in turn, changes the amount of curvature necessary for the bimetallic member 22 to cause the resilient member 18 to be forced downwardly. Accordingly, the manually operable means 24 is operatively associated with the bimetallic member in such a manner that it adjustably positions the bimetallic member in a plurality of operative positions for effecting engagement and disengagement of the cooperating contacts 14 and 16 as the bimetallic member changes from one position to another in response to changes in temperature conditions thereof, and, in addition, the manually operable adjusting means may position the bimetallic member 22 in an inoperative position where the bimetallic member is free to change its shape or curvature in response to the changing temperature conditions thereof without having the insulator button 76 thereon contact the resilient member 18 and, therefore, without effecting a change in position or disengagement of the contacts.

Various modifications may be made in the device embodying our invention without departing from the spirit and scope thereof, and we desire, therefore, that only such limitations shall be placed thereon as are imposed by the prior art and the appended claims.

We claim as our invention:

1. In a circuit interrupter, a supporting structure therefor, a stationary contact and a contact arm including a cooperating movable contact, a thermally responsive member mounted upon said structure electrically independent of said contacts and resting upon said contact arm, said thermally responsive member adapted to change its shape in response to the changes in temperature thereof, and manually operable means operatively associated with the thermally responsive member for adjustably positioning the member in a plurality of operative positions for effecting engagement and disengagement of the contact means as the thermally responsive member changes from one position to another responsive to temperature changes and in an inoperative position where the thermally responsive member is free to change its shape with changing temperature conditions without effecting engagement of the contacts.

2. In a circuit interrupter, a supporting structure therefor, contact means including a movable contact structure, a bimetallic strip-type member pivotally mounted upon said structure electrically independent of said contacts and provided with bottom support by the movable contact structure, said bimetallic member adapted to change its shape in response to the changes in temperature thereof, and manually operable means operatively associated with the bimetallic member for adjustably positioning the member in a plurality of operative positions for effecting engagement and disengagement of the contact means as the bimetallic member changes from one position to another responsive to temperature changes and in an inoperative position where the bimetallic member is free to change its shape with changing temperature conditions without effecting engagement of the contacts.

3. In a circuit interrupter, a supporting structure therefor, contact means including a movable contact structure, a contact-supporting member attached to the supporting structure and carrying the movable contact, a bimetallic member rockably mounted upon said structure electrically independent of said contacts and having its ends respectively supported by the contact-supporting member and by said supporting structure, said bimetallic member adapted to change its shape in response to changes in temperature thereof, the support of said one end of said bimetallic member by said supporting structure being adjustable to position the member in a plurality of operative positions for effecting engagement and disengagement of the contact means through the cooperative action of the contact-supporting member as the bimetallic member changes from one position to another in response to temperature changes and in an inoperative position where the bimetallic member is free to change its shape with changing temperature conditions without effecting engagement of the contacts.

4. In a thermostat, a supporting base, a plurality of cooperating contacts including a stationary and a movable contact, the stationary contact being insulatedly attached to the base, a resilient member attached to the base and supporting the movable contact, said resilient member biasing the contacts together, a pivot rivet rigidly attached to the supporting base, a bimetallic member pivotally attached to the pivot rivet intermediate the ends thereof and adapted to change its curvature in response to changes in temperature thereof, an insulating member attached at one end of the bimetallic member for effecting contact between the bimetallic member and resilient member and for insulating the bimetallic member from the resilient member as the member changes its shape, and manually operable means operatively associated with the other end of the bimetallic member and supporting base for adjustably positioning said member in a plurality of operative positions for effecting engagement and disengagement of the contact means through the cooperative action of the resilient member as the bimetallic member changes from one position to another about the pivot rivet as a fulcrum responsive to temperature changes and in an inoperative position where the bimetallic member is free to change its shape with changing temperature conditions without effecting a change in position of the movable contact or resilient member.

5. In a thermostatic control, a supporting structure, cooperating contacts including a movable contact, a contact-carrying member attached at one end to the base and supporting the movable contact on substantially the free end thereof, a bimetallic member pivotally attached to the base intermediate the ends thereof and adapted to change its curvature in response to changes in the temperature thereof and adapted to rest upon and move said contact-carrying member as the bimetallic member changes its shape, and manually operable adjusting means for varying the amount of curvature necessary for the bimetallic member to force the contact-carrying member to effect disengagement of the cooperating contacts.

6. In a thermostat, a supporting structure, a contact-carrying resilient member attached to the structure, a thermally responsive member, a fulcrum structure secured to said supporting structure opposite an intermediate point of said thermally responsive member, said thermally responsive member being detachably mounted at said intermediate point upon said fulcrum structure and being supported at one end by the resilient member to prevent said thermally responsive member from becoming detached from its mounting.

7. In a thermostat, a supporting structure, a contact-carrying resilient member attached to the structure, a thermally responsive member, a fulcrum structure secured to the lower side of said supporting structure opposite an intermediate point of said thermally responsive member, said thermally responsive member being mounted without bottom support at said intermediate point upon said fulcrum structure and being supported at one end by the resilient member to prevent gravity from dislodging said thermally responsive member from its mounting and mounted at its other end on the structure.

EARL K. CLARK.
PAUL R. LEE.